United States Patent
Ye et al.

(10) Patent No.: US 12,349,244 B2
(45) Date of Patent: Jul. 1, 2025

(54) FLEXIBLE HEAT PRESERVATION BOARD WITH HEATING WIRE ENCAPSULATED THEREIN

(71) Applicant: Guangdong Willing Technology Corporation, Guangdong (CN)

(72) Inventors: Jingnong Ye, Guangdong (CN); Shifa Luo, Guangdong (CN); Kunhuan Feng, Guangdong (CN)

(73) Assignee: Guangdong Willing Technology Corporation, Huizhou (CN)

( * ) Notice: Subject to any disclaimer, the term of this patent is extended or adjusted under 35 U.S.C. 154(b) by 0 days.

(21) Appl. No.: 18/939,571

(22) Filed: Nov. 7, 2024

(65) Prior Publication Data

US 2025/0063637 A1    Feb. 20, 2025

Related U.S. Application Data

(63) Continuation of application No. 18/646,924, filed on Apr. 26, 2024.

(30) Foreign Application Priority Data

Apr. 27, 2023 (CN) .......................... 202321013145.6

(51) Int. Cl.
H05B 3/36 (2006.01)
(52) U.S. Cl.
CPC ......... *H05B 3/36* (2013.01); *H05B 2203/003* (2013.01); *H05B 2203/014* (2013.01); *H05B 2203/016* (2013.01)
(58) Field of Classification Search
None
See application file for complete search history.

(56) References Cited

U.S. PATENT DOCUMENTS

| 6,476,361 B2 | 11/2002 | Kasai et al. |
| 7,019,265 B2 | 3/2006 | Coleman |

(Continued)

FOREIGN PATENT DOCUMENTS

| CN | 209402752 U | 9/2019 |
| CN | 217696208 U | 11/2022 |

(Continued)

OTHER PUBLICATIONS

DE 19952718 A1 (Gehrmann M) Jun. 7, 2001 [retrieved on Feb. 19, 2025]. Retrieved from Foreign Image and Text database, translation by Clarivate Analytics. (Year: 2001).*

*Primary Examiner* — Steven W Crabb
*Assistant Examiner* — Theodore J Evangelista
(74) *Attorney, Agent, or Firm* — S.J. Intellectual Property LTD.

(57) ABSTRACT

A flexible heat preservation board with heating wire encapsulated therein includes a heating pad, a heating wire and a liquid adhesive. A first side of the heating pad is defined with a groove and arranged with a plurality of projections. The heating pad is provided with a power supplier. Inner surfaces of the groove are provided with a first protrusion and a second protrusion respectively. A bottom surface of the groove, lower surfaces of the first protrusion and the second protrusion define an open accommodating space for receiving the heating wire. A first gap is formed between the first protrusion and the heating wire, a second gap is formed between the second protrusion and the heating wire. The liquid adhesive encapsulates the first protrusion, the second protrusion, and the heating wire in the groove. Both the heating pad and the heating wire are flexible.

7 Claims, 2 Drawing Sheets

(56) References Cited

U.S. PATENT DOCUMENTS

2006/0241730 A1\* 10/2006 Huang .................... A61F 7/007
607/98
2010/0116818 A1\* 5/2010 Gabbay .................... H05B 6/36
219/528

FOREIGN PATENT DOCUMENTS

CN 218186387 U 1/2023
DE 19952718 A1 \* 6/2001 ........... B60H 1/2225

\* cited by examiner

FLEXIBLE HEAT PRESERVATION BOARD WITH HEATING WIRE ENCAPSULATED THEREIN

CROSS REFERENCE TO RELATED APPLICATIONS

This is a continuation of U.S. patent application Ser. No. 18/646,924 filed on Apr. 26, 2024, which claims priority of Chinese patent application CN 202321013145.6, filed on Apr. 27, 2023, both of which are incorporated herein by reference in their entirety.

FIELD

The present disclosure relates to the technical field of heat preservation boards and, particularly, to a flexible heat preservation board with heating wire encapsulated therein.

BACKGROUND

As people's living standards continue to improve, there is a growing emphasis on nutrition, flavor, and uniqueness in dining, with a particular focus on maintaining the freshness of dishes throughout the meal. Currently, existing dining tables offer convenience for diners to access food, but they do not keep dishes warm, affecting the dining experience. Additionally, many workers, after working overtime, want to enjoy hot meals at home but need to reheat them, which can affect the taste. Therefore, a food heating device has been developed, which can be placed on the table to heat or keep food warm, eliminating the need for reheating.

SUMMARY

Proposed in the present disclosure is a flexible heat preservation board, including a heating pad, a heating wire, and a liquid adhesive. The heating pad is provided with a power supplier. A first side of the heating pad is defined with a groove, the groove is arranged in a winding pattern, and the first side of the heating pad is also arranged with a plurality of projections having an equal height. Both ends of the heating wire are connected to the power supplier. A first inner surface of the groove is provided with a first protrusion, a second inner surface of the groove is provided with a second protrusion, and the first protrusion and the second protrusion face each other. A bottom surface of the groove, a lower surface of the first protrusion and a lower surface of second protrusion define an open accommodating space for receiving the heating wire. A first gap is formed between the lower surface of the first protrusion and a first outer surface of the heating wire. A second gap is formed between the lower surface of the second protrusion and a second outer surface of the heating wire. The liquid adhesive encapsulates the first protrusion, the second protrusion, and the heating wire in the groove. Both the heating pad and the heating wire are flexible.

BRIEF DESCRIPTION OF THE DRAWINGS

In order to illustrate the technical solutions of the embodiments of the present disclosure or of the prior art more clearly, the following drawings are briefly described as required in the context of the embodiments or the prior art. Obviously, the following drawings illustrate only some of the embodiments of the present disclosure. Other relevant drawings may be obtained on the basis of these drawings without any creative effort by those skilled in the art.

DETAILED DESCRIPTION OF THE EMBODIMENTS

The technical solutions in the embodiments of the present disclosure are clearly and completely described and discussed below in conjunction with the attached drawings of the embodiments of the present disclosure. Obviously, the embodiments described herein are only some of the embodiments of the present disclosure but not all of them. Based on the embodiments in the present disclosure, all other embodiments obtained by those skilled in the art without creative efforts fall within the scope of protection of the present disclosure.

Most of the existing meal heating devices are made of metal or glass materials, which, due to their high rigidity, lead to a large occupation of space when they are not required for use and are difficult to store.

Figure 1:
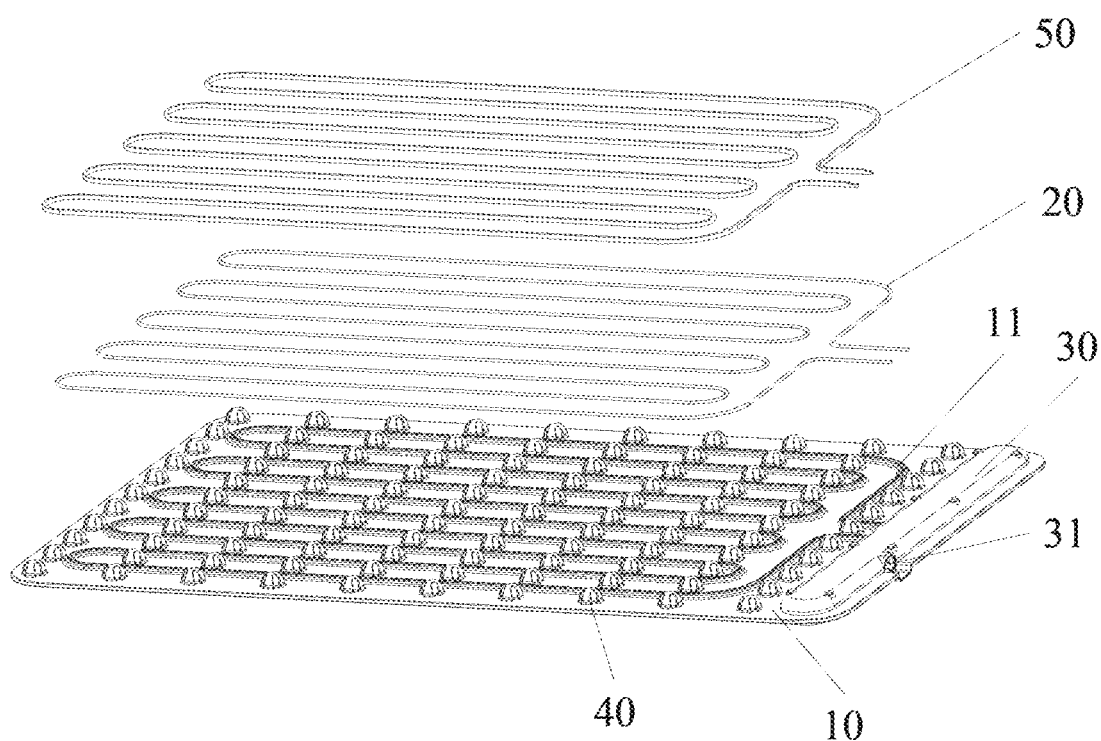
FIG. 1 is an exploded view of the flexible heat preservation board of the embodiments of the present disclosure.
Figure 2:
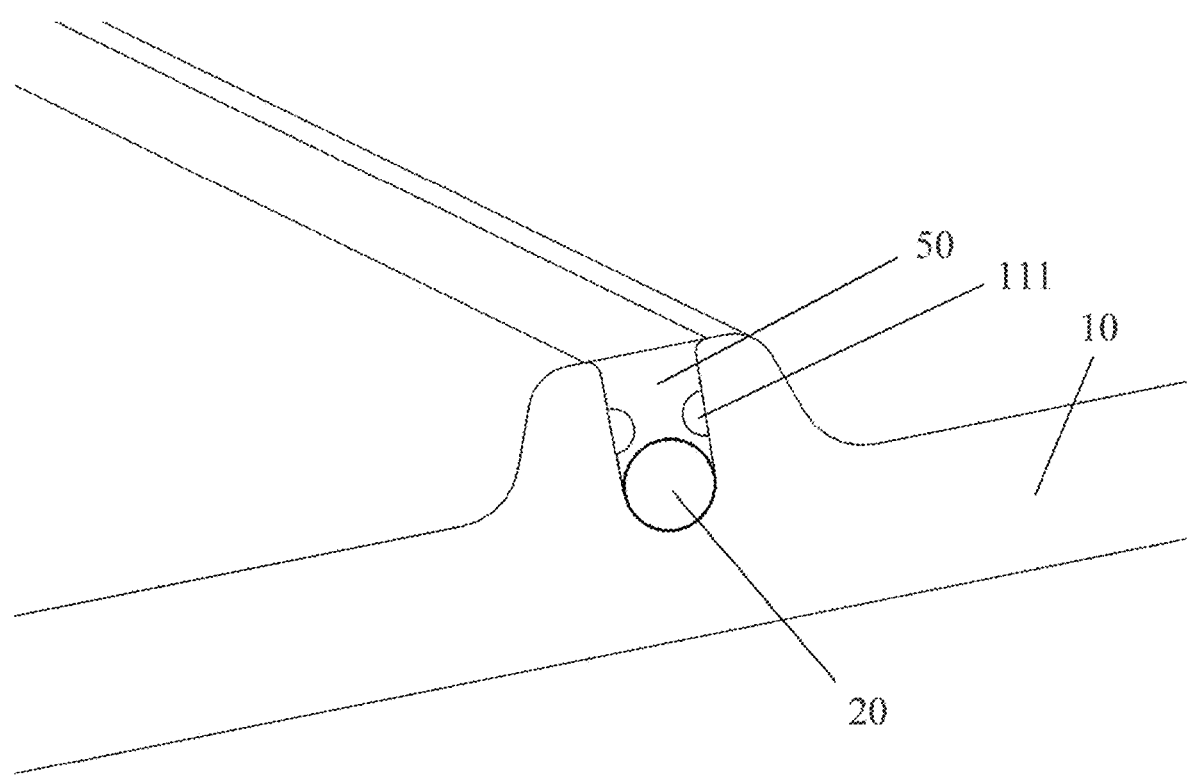
FIG. 2 is a section view of the flexible heat preservation board of the embodiments of the present disclosure.

As shown in FIG. 1 and FIG. 2, to solve the aforementioned problems, proposed in the present embodiment is a flexible heat preservation board, including a heating pad 10 and a heating wire 20, in which the heating pad 10 is formed with a groove 11 for threading the heating wire 20, the groove 11 is uniformly distributed around the heating pad 10, the heating pad 10 is provided with a power supplier 30 to which an end of the heating wire 20 is connected, a side of the heating pad 10 is formed with a plurality of projections 40 having a same height, and the heating pad 10 and the heating wire 20 are both made of flexible materials.

Preferably, in the present embodiment, an opening of the groove 11 and the projections 40 are positioned on a same side of the heating pad 10.

Preferably, in the present embodiment, the heating wire 20 is made of flexible materials such as silicone, carbon fiber, graphene, PVC, and PTFE.

Preferably, in the present embodiment, the power supplier 30 is provided convexly and in a same direction as the protruding direction of the projections 40, and an opposite side of the heating pad 10 is of a planar structure.

In the present embodiment, after the heating pad 10 is assembled with the heating wire 20, the overall temperature of the heating pad 10 rises as the heating wire 20 is powered on for increasing time, and the heat is then transferred to the dishes thereon through heat transfer, which achieves a heat preservation effect. Also, as the heating wire 20 in the present embodiment is extended uniformly around the heating pad 10, the temperature is relatively uniform at various places on the heating pad 10, which increases the heat preservation area on the heating pad 10, i.e., the heating pad 10 of the present embodiment may be used for heat preservation of a relatively large number of dishes.

Specifically, the flexible heat preservation board further includes a liquid adhesive 50 for encapsulating the heating wire 20 in the groove 11.

Preferably, in the present embodiment, liquid silicone is selected to encapsulate the heating wire 20.

In the present embodiment, the groove 11 is formed with an opening for the heating wire 20 to be entered into, so that the heating wire 20 is more likely to be detached from the opening under an external force. Therefore, encapsulation by means of the liquid adhesive 50 ensures that the heating wire 20 is still fixed in the groove 11 under the presence of an external force, i.e., it ensures the structural stability of the heat preservation board.

More specifically, an inner side of the groove 11 is provided with a limiting structure, the limiting structure includes two protrusions 111 disposed in opposite directions, and a distance between the protrusions 111 and the groove 11 is greater than or equal to a diameter of the heating wire 20.

Preferably, in the present embodiment, the protrusions 111 are of a bar-shaped structure and are provided in a length direction of the groove 11. It is preferred, but not limited, that the protrusions in the present embodiment may also be provided in the form of a block structure and evenly distributed within the groove 11.

Preferably, a cross-section of each of the protrusions 111 is of semicircular shape and their arcuate surfaces are disposed opposite to each other.

Preferably, in the present embodiment, a distance between the protrusions 111 is less than a diameter of the heating wire 20. However, as the heating wire 20 and the heating pad 10 are made of flexible materials, the protrusions 111 tend to expand outwardly when extruded by the heating wire 20, thereby allowing the heating wire 20 to pass through smoothly. The protrusions 111 returns to its original state due to the absence of the external force, achieving an effective fixation effect on the heating wire 20.

In the present embodiment, the protrusions 111 includes a first protrusion and a second protrusion. A first inner side of the groove 11 is provided with the first protrusion, a second inner side of the groove 11 is provided with the second protrusion, the first protrusion and the second protrusion face each other. A bottom surface of the groove, a lower surface of the first protrusion and a lower surface of second protrusion define an open accommodating space, the heating wire 20 is received in the open accommodating space. A first gap is formed between the lower surface of the first protrusion and a first outer surface of the heating wire, a second gap is formed between the lower surface of the second protrusion and a second outer surface of the heating wire 20.

In the present embodiment, the protrusions 111 achieve a first fixation effect on the heating wire 20, and then the liquid adhesive 50 fills gaps in the groove 11 to achieve a second fixation effect on the heating wire 20, which greatly ensures the fixation state of the heating wire 20.

More specifically, a beginning segment and an end segment of the groove 11, provided in parallel to each other, are extended toward an outer edge of the flexible heat preservation board, then bent in a U-shape repeatedly toward a centerline of the heating pad 10, and finally connected.

Preferably, in the present embodiment, the beginning segment and the end segment of the groove 11 are positioned at the same shorter edge of the heating pad 10 and each is extended in a direction along the longer edge. The groove 11 is then bent in a U-shape repeatedly and extended further in a direction along the longer edge until it is connected to the beginning or end segment.

In the present embodiment, the groove 11 provided by adopting the aforementioned solution effectively ensures that it is uniformly provided along the heating pad 10, thereby ensuring that the heat from the heating wire 20 achieves the overall heating effect of the heating pad 10.

More specifically, the power supplier 30 is provided on an end of the heating pad 10, and both ends of the heating wire 20 are connected to the power supplier 30.

More specifically, an end of the power supplier 30 proximal to an edge of the heating pad 10 is provided with a terminal 31.

Preferably, in the present embodiment, the terminal 31 is used to connect to an external power supply and to power the heating wire 20.

More specifically, the projection 40 is distributed on a backside of the heating pad 10, and a front side of the heating pad 10 is overlaid with a thermochromic layer.

Preferably, in the present embodiment, the thermochromic layer includes a pattern and a color of the pattern changes as the temperature is increased. It is preferred, but not limited, that the closer the color is to red, the higher the temperature.

Preferably, in the present embodiment, an end of the projection 40 is hemispherical, which may effectively ensure the support effect of the projection 40 on the heating pad 10, and also accelerate the circulation rate of the air under the heating pad 10.

In summary, proposed in the present embodiment is a flexible heat preservation board, which consists of a heating pad and a heating wire made of flexible material, achieves the heat preservation effect of the heating pad after being powered on, and may also be stored by rolling up, and also maintains the normal use of the heating pad under repeated and continuous rolling up and releasing.

Firstly, in the proposed technical solution of the present disclosure, the heating pad and the heating wire are both made of flexible materials, i.e., the heat preservation board may be stored by rolling up, and the heating wire is sealed in the groove by adhesive, so that the normal work of the heat preservation board may be guaranteed by repeated rolling up and releasing, which greatly improves the storage convenience and ensures the service life of the product.

Secondly, in the proposed technical solution of the present disclosure, the first protrusion and the second protrusion in the groove effectively ensures the fixation of the heating wire in the groove and ensures the position of the heating wire is fixed during normal use and during the process of rolling up and storage, thereby ensuring the normal use of the product.

Thirdly, in the proposed technical solution of the present disclosure, the groove is provided in such a way as to effectively ensure that the heating wire is uniformly distributed over an area of the heating pad, thereby rendering the heating effect uniform at various places on the heating pad, which greatly increases the heat preservation area on the heat preservation board, and improves the utilization rate of the heat preservation board.

Fourthly, in the proposed technical solution of the present disclosure, a surface of the heat preservation board is also provided with a thermochromic layer, which is used to warn the current surface temperature of the heat preservation board, which avoids burns caused by accidental touching and improves the safety of the heat preservation board.

The embodiments described above do not constitute a limitation of the scope of protection of the technical solution. Any modifications, equivalent substitutions, improvements, or the like made within the spirit and principles of the above embodiments shall be included in the scope of protection of the technical solution.

What is claimed is:

1. A flexible heat preservation board, comprising:
a heating pad, provided with a power supplier, wherein a first side of the heating pad is defined with a groove, the groove is arranged in a winding pattern, and the first side of the heating pad is also arranged with a plurality of projections having an equal height;

a heating wire, wherein both ends of the heating wire are connected to the power supplier; and a liquid adhesive;

wherein a first inner surface of the groove is provided with a first protrusion, a second inner surface of the groove is provided with a second protrusion, and the first protrusion and the second protrusion face each other; a distance between a first edge of the first protrusion and a second edge of the second protrusion is less than a diameter of the heating wire, a bottom surface of the groove, a lower surface of the first protrusion and a lower surface of second protrusion define an open accommodating space for receiving the heating wire; a first gap is formed between the lower surface of the first protrusion and a first outer surface of the heating wire; a second gap is formed between the lower surface of the second protrusion and a second outer surface of the heating wire; the liquid adhesive encapsulates the first protrusion, the second protrusion, and the heating wire in the groove; and both the heating pad and the heating wire are flexible.

2. The flexible heat preservation board according to claim 1, wherein the first protrusion has a semicircular cross section, and the second protrusion has a semicircular cross section.

3. The flexible heat preservation board according to claim 2, wherein the first protrusion and the second protrusion are provided in a longitudinal direction of the groove.

4. The flexible heat preservation board according to claim 1, wherein a beginning segment and an end segment of the groove are parallel to each other.

5. The flexible heat preservation board according to claim 1, wherein the power supplier is provided on an end of the heating pad.

6. The flexible heat preservation board according to claim 5, wherein an end of the power supplier is provided with a terminal.

7. The flexible heat preservation board according to claim 1, wherein the first side of the heating pad is a backside of the heating pad.

* * * * *